(12) United States Patent
Kusuura

(10) Patent No.: US 8,077,589 B2
(45) Date of Patent: Dec. 13, 2011

(54) OPTICAL RECORDING MEDIUM, ERASURE APPARATUS AND ERASURE METHOD THEREOF

(75) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 80 days.

(21) Appl. No.: 12/642,392

(22) Filed: Dec. 18, 2009

(65) Prior Publication Data

US 2010/0246360 A1    Sep. 30, 2010

(30) Foreign Application Priority Data

Mar. 31, 2009  (JP) .................................. 2009-085823

(51) Int. Cl.
*G11B 7/00*   (2006.01)
(52) U.S. Cl. ......................... 369/275.2; 369/283; 369/83
(58) Field of Classification Search ......................... None
See application file for complete search history.

(56) References Cited

FOREIGN PATENT DOCUMENTS

| | | |
|---|---|---|
| JP | 2002-304736 | 10/2002 |
| JP | 2003-022567 | 1/2003 |
| JP | 2003-529172 | 9/2003 |
| JP | 2003-338080 | 11/2003 |
| JP | 2008-287793 | 11/2008 |

OTHER PUBLICATIONS

Notice of Reasons for Rejection for JP 2009-085823 mailed May 25, 2009 (with English translation).
Decision of Rejection for JP 2009-085823 mailed Sep. 16, 2009 (with English translation).

*Primary Examiner* — Muhammad N Edun
(74) *Attorney, Agent, or Firm* — Foley & Lardner LLP

(57) ABSTRACT

A new optical recording medium capable of reducing the burden in erasing data in the optical recording medium is provided. The optical recording medium includes an organic pigment recording layer 12 and a light reflecting layer 14, which are at least laminated on a substrate 11, wherein a photocatalyst layer 13 is formed in contact with the organic pigment recording layer 12.

18 Claims, 4 Drawing Sheets

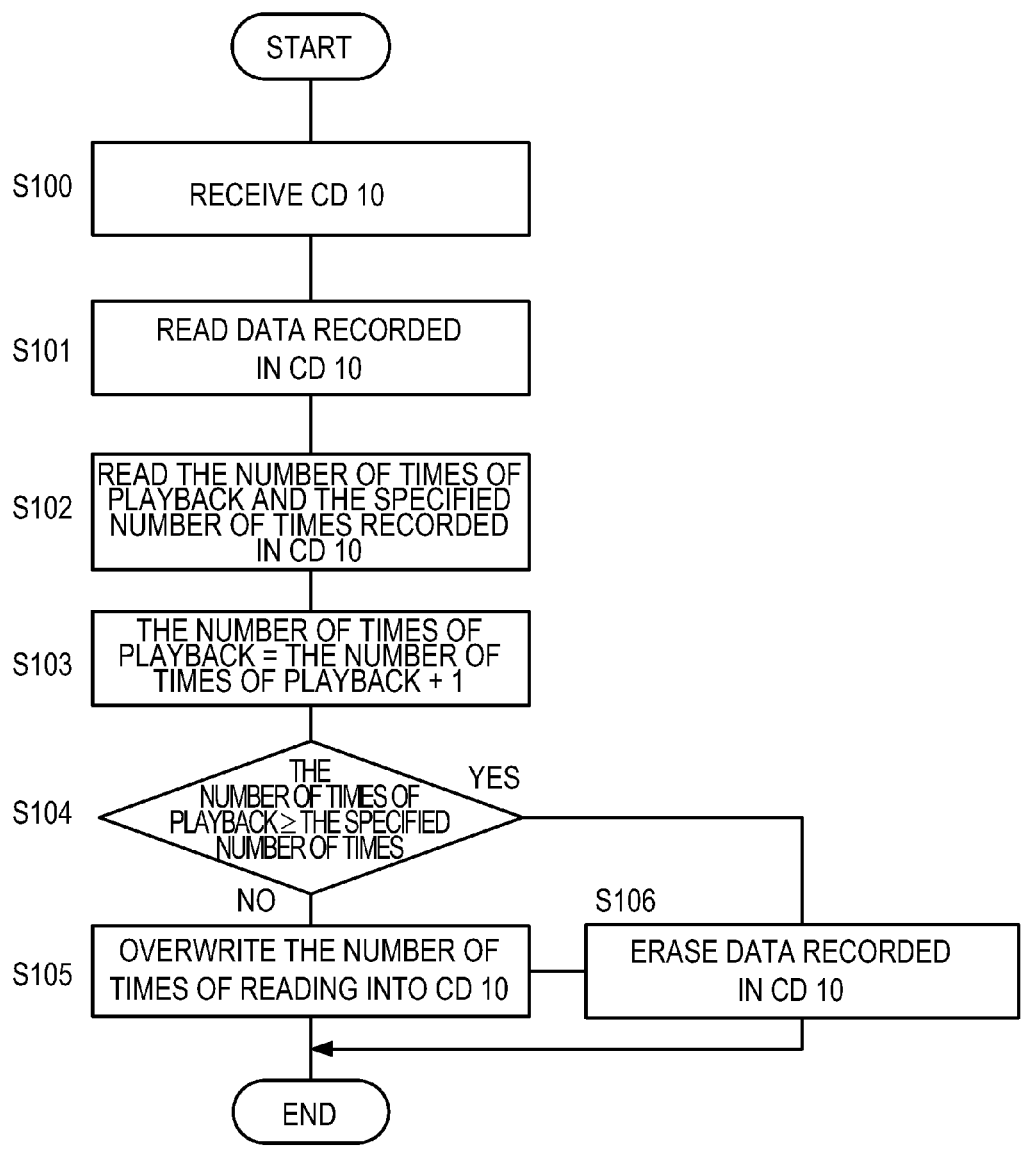

OPTICAL RECORDING MEDIUM, ERASURE APPARATUS AND ERASURE METHOD THEREOF

CROSS REFERENCE TO RELATED APPLICATION

This application claims the benefit of Japanese Application No. 2009-85823 filed on Mar. 31, 2009 which is incorporated herein by reference.

BACKGROUND OF THE INVENTION

1. Field of the Invention

The present disclosure relates to an optical recording medium, erasure apparatus and erasure method thereof.

2. Description of the Related Art

Conventionally, optical recording media (optical disks) such as CD, DVD and BD are used as media for recording and reading data such as document, music and video. Optical recording media can record data by, for example, transforming an organic pigment recording layer included in the optical recording media using a laser beam for writing and read data by irradiating the organic pigment recording layer with a laser beam for reading from differences in intensity of the reflected light.

Such optical recording media have a feature of being able to repeatedly read recorded data for a long period of time, and are therefore widely used to record personal data, corporate data or the like. Furthermore, rental services are also widely available whereby contents such as music data or video data are recorded in optical recording media and the optical recording media are lent out to users.

When optical recording media that record personal data or corporate data are disposed of, data is generally erased before the disposal to prevent leakage of the recorded data. Conventionally, a method of overwriting data recorded in optical recording media with meaningless data using a data writing apparatus is adopted to erase the data (e.g., see Japanese Patent Laid-Open No. 2002-304736), but overwriting recorded data one by one is troublesome and time-consuming work and forces users to bear the burden.

On the other hand, a rental service assumes that optical recording media which have been lent out are collected back, but a procedure for sending back or returning the media constitutes a burden to users and management of the recording media which have been lent out and a procedure for collecting back the media constitutes a burden to rental service providers.

Thus, it is desirable to reduce the burden in erasing data in optical recording media. In a rental service of optical recording media in which contents are recorded, it is also desirable to reduce the burden on users and rental service providers to collect back the optical recording media.

SUMMARY OF THE INVENTION

The optical recording medium according to the present disclosure includes an organic pigment recording layer and a light reflecting layer, which are at least laminated on a substrate, wherein a photocatalyst layer is formed in contact with the organic pigment recording layer.

Furthermore, in the optical recording medium according to the present disclosure, the photocatalyst layer may demonstrate oxidation when irradiated with ultraviolet rays of a short wavelength.

The erasure apparatus according to the present disclosure is an erasure apparatus that erases information recorded in an optical recording medium including an organic pigment recording layer and a light reflecting layer, which are at least laminated on a substrate, wherein a photocatalyst layer is formed in contact with the organic pigment recording layer, the erasure apparatus including erasing device configured to erase the information recorded in the organic pigment recording layer by irradiating the optical recording medium with light whereby the photocatalyst layer demonstrates oxidation.

Furthermore, in the erasure apparatus according to the present disclosure, the irradiating device receives an irradiation instruction from a user, irradiates the optical recording medium with the light and erases the information recorded in the organic pigment recording layer.

Furthermore, in the erasure apparatus according to the present disclosure, the irradiating device irradiates, after the optical recording medium has been read a specified number of times, the optical recording medium with the light and erases information recorded in the organic pigment recording layer.

The erasure method according to the present disclosure is a method for erasing information recorded in an optical recording medium including an organic pigment recording layer and a light reflecting layer, which are at least laminated on a substrate, wherein a photocatalyst layer is formed in contact with the organic pigment recording layer, the erasure method including irradiating the optical recording medium with light whereby the photocatalyst layer demonstrates oxidation.

BRIEF DESCRIPTION OF THE DRAWINGS

FIG. 4 is an example of a flowchart in the operation method of the reading/erasure apparatus 20 of the optical recording medium according to the present embodiment.

DETAILED DESCRIPTION OF THE PREFERRED EMBODIMENTS

Figure 1:
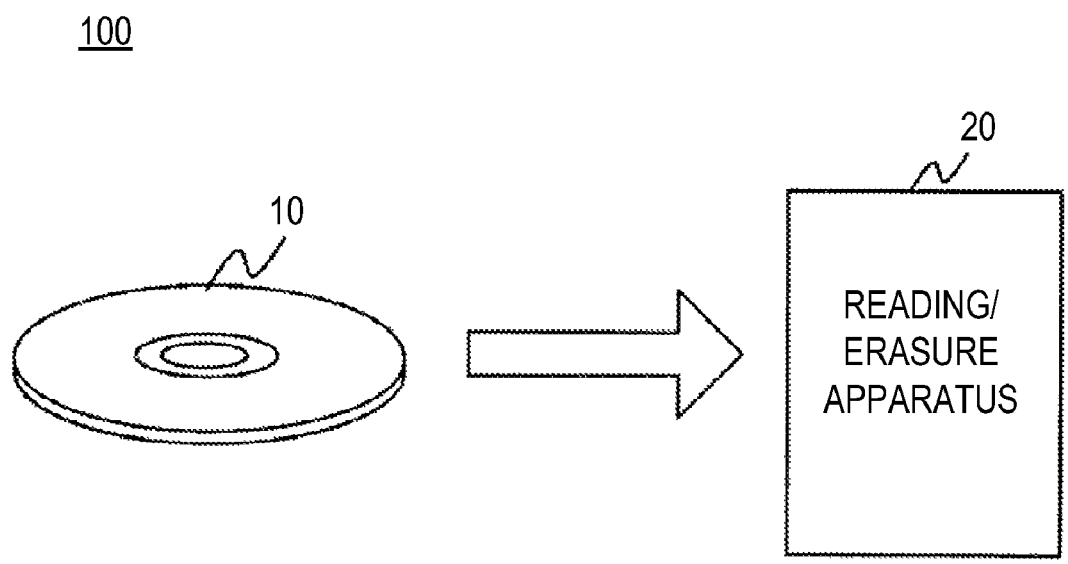
FIG. 1 is a block diagram illustrating a schematic configuration of an optical recording medium reading/erasure system 100 according to the present embodiment.

Hereinafter, a preferred embodiment for implementing the present disclosure will be described with reference to the accompanying drawings. In the present embodiment, a compact disk (CD) will be taken as an example of an optical recording medium. The sizes of and positional relationships between members or the like shown in the drawings may be exaggerated to clarify their descriptions.

FIG. 1 is a block diagram illustrating a schematic configuration of an optical recording medium reading/erasure system 100 according to an embodiment of the present disclosure.

The optical recording medium reading/erasure system 100 includes a CD 10 and a reading/erasure apparatus 20 that reads data recorded in the CD as shown in FIG. 1.

The CD 10 is an optical disk that allows data (information) to be read from a variation in reflected light of irradiated light. Suppose the size and thickness and data recording scheme or the like of the CD 10 itself of the present embodiment can be made compliant with the same standard for a conventional CD, for example, contents specified in standard reference books such as a so-called "Red Book" and "Yellow Book," and therefore detailed descriptions thereof will be omitted.

Figure 2:
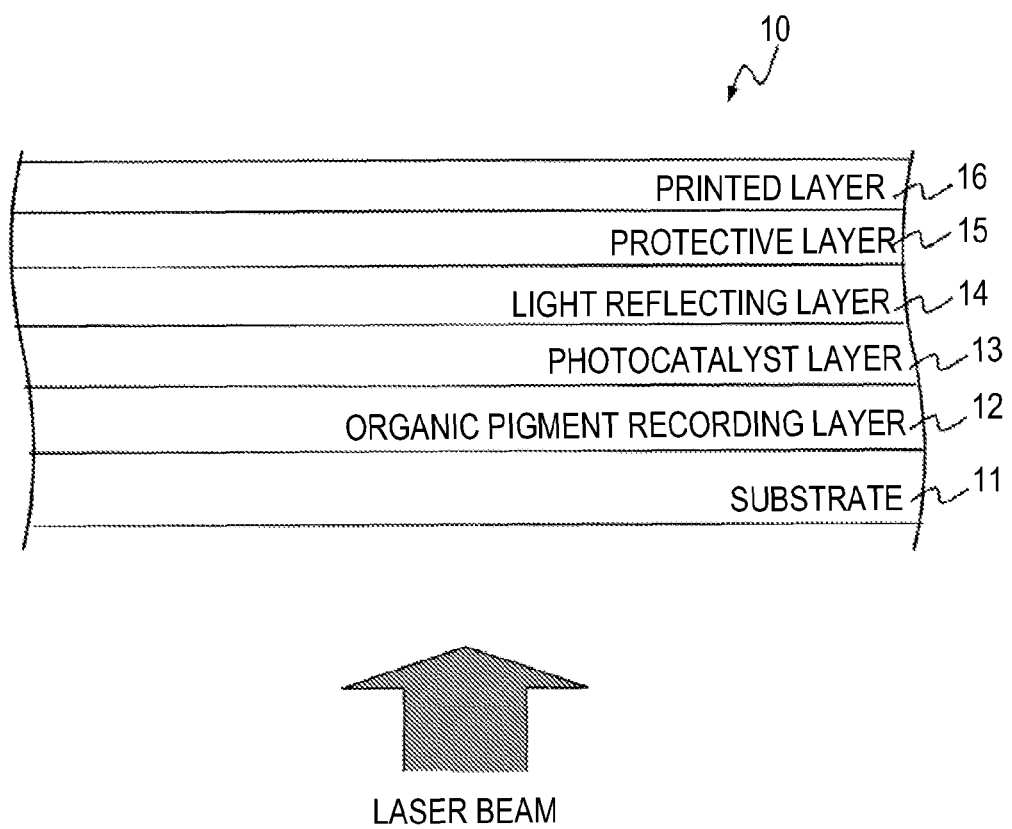
FIG. 2 is a schematic cross-sectional view of the optical recording medium 10 according to the present embodiment.

As shown in FIG. 2, the CD 10 is configured with an organic pigment recording layer 12, a photocatalyst layer 13, a light reflecting layer 14, a protective layer 15 and a printed layer 16 laminated on one side of a substrate 11 in a data recording region thereof. The CD 10 allows data recorded in the organic pigment recording layer 12 to be read by irradiating a laser beam from the opposite side of the side on which the organic pigment recording layer 12 or the like of the substrate 11 are laminated.

The substrate 11 is a board to secure mechanical strength of the CD 10 and is a disk-shaped transparent board that allows a laser beam to penetrate. The substrate 11 may be designed to have the same material and thickness as those of a substrate of a conventional CD. For example, polycarbonate-based resin or acrylic-based resin may be used as the material of the substrate 11.

The organic pigment recording layer 12 is a recording layer of organic pigment formed on the substrate 11. The organic pigment recording layer 12 can record data (information) by transforming the surface of the layer into an uneven shape using a variation in the organic pigment through irradiation of a laser beam for writing. The organic pigment recording layer 12 may have the same organic pigment and thickness as those of an organic pigment recording layer of a conventional CD. Pigments such as cyanine, phthalocyanine or azo may be used as the organic pigment (organic matter).

The photocatalyst layer 13 is a layer (film) of a photocatalyst formed in contact with the organic pigment recording layer 12. For example, titanium oxide ($TiO_2$) may be used as the photocatalyst. The photocatalyst layer 13 demonstrates oxidation when irradiated with ultraviolet rays or the like. When the photocatalyst layer 13 demonstrates oxidation, the organic matter contained in the organic pigment recording layer 12 in contact with the photocatalyst layer 13 is deprived of electrons and the bonding of the organic matter is divided. As a result, the uneven shape on the layer surface of the organic pigment recording layer 12 is lost, and therefore the data recorded in the organic pigment recording layer 12 is lost. The thickness of the photocatalyst layer 13 can be determined according to the material and thickness of the organic pigment recording layer 12 so that the data recorded in the organic pigment recording layer 12 may be erased through oxidation thereof. The substance of the photocatalyst is not limited to titanium oxide, but any appropriate substance may be used according to the type of light irradiated.

The light reflecting layer 14 is formed on top of the photocatalyst layer 13 and is the layer that reflects a laser beam having a specific wavelength irradiated through the substrate 11, organic pigment recording layer 12 and photocatalyst layer 13. The light reflecting layer 14 may have the same material and thickness as those of a light reflecting layer of a conventional CD. For example, metal such as silver or aluminum may be used as the material of the light reflecting layer 14.

The protective layer 15 is the layer to protect layers such as the organic pigment recording layer 12, photocatalyst layer 13 and light reflecting layer 14. The protective layer 15 may have the same material and thickness as those of a protective layer of a conventional CD. For example, polycarbonate-based resin may be used as the material of the protective layer 15 as in the case of the above described substrate 11.

The printed layer 16 is usually used as a label surface and characters, symbols, pattern or a combination thereof or the like are displayed by printing as visible information on the surface thereof. The printed layer 16 may have the same material and thickness as those of a printed layer of a conventional CD. The printed layer 16 may be omitted in the optical recording medium.

The reading/erasure apparatus 20 has the function of loading the CD 10 into the apparatus and reading data recorded in the CD 10, and the function of irradiating the CD 10 with ultraviolet rays and erasing the data recorded in the CD 10.

Figure 3:
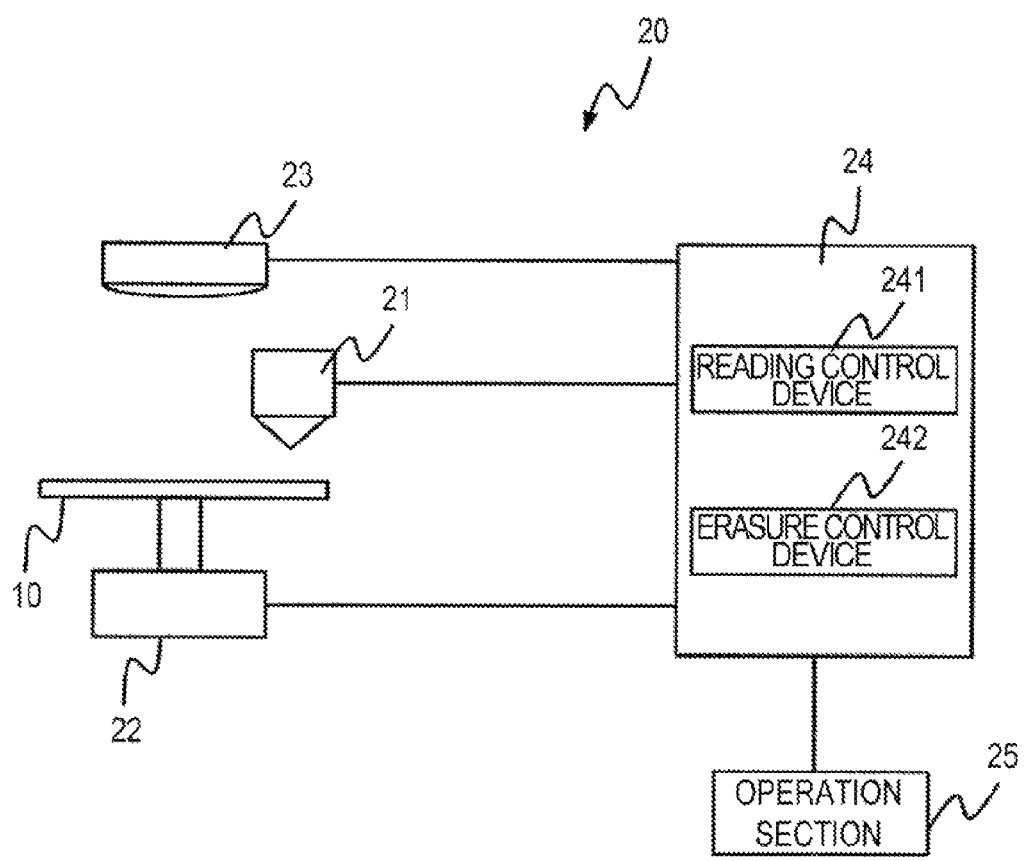
FIG. 3 is a block diagram illustrating a schematic configuration of the reading/erasure apparatus 20 of the optical recording medium according to the present embodiment.

As shown in FIG. 3, to realize the data reading function, the reading/erasure apparatus 20 has a first optical irradiation system 21 that irradiates the CD 10 with a laser beam and a spindle motor 22 that rotates the CD 10. Furthermore, to realize the data erasure function, the reading/erasure apparatus 20 has a second optical irradiation system 23 that irradiates the surface of the CD 10 with light whereby the photocatalyst layer 13 demonstrates oxidation. The reading/erasure apparatus 20 further includes control device 24 (reading control device 241, erasure control device 242) that controls the first optical irradiation system 21, spindle motor 22 and second optical irradiation system 23 and an operation section 25 through which the user gives an operation command to the control device 24. According to the present embodiment, the first optical irradiation system 21, spindle motor 22 and reading control device 241 constitute the reading device and the second optical irradiation system 23 and erasure control device 242 constitute the erasure device described in the scope of claims.

The first optical irradiation system 21 irradiates the CD 10 with a laser beam for data reading during data reading and detects reflected light reflected from the CD 10. The first optical irradiation system 21 can have a configuration and function similar to those of an optical irradiation system of a conventional CD reading apparatus (playback apparatus), and therefore detailed descriptions thereof will be omitted.

The spindle motor 22 is the motor that rotates the CD 10 to continuously read data from the data recording region of the CD 10 through the first optical irradiation system 21. The spindle motor 22 can have a configuration and function similar to those of a spindle motor of a conventional CD reading apparatus, and therefore detailed descriptions thereof will be omitted.

The second optical irradiation system 23 irradiates the CD 10 with light for data erasure during data erasing. As the light for data erasure irradiated from the second optical irradiation system 23, for example, short wavelength ultraviolet rays whereby the photocatalyst layer 13 demonstrates oxidation may be used. The short wavelength ultraviolet rays are ultraviolet rays of approximately 280 nm or less and are ultraviolet rays having a wavelength not included in sunlight that arrives on the surface of the Earth. That is, when the photocatalyst that demonstrates oxidation with a wavelength of short wavelength ultraviolet rays or shorter is used for the photocatalyst layer 13, the photocatalyst layer 13 of the CD 10 does not demonstrate oxidation with sunlight, and it is thereby possible to prevent recorded data from being lost even when the CD 10 is handled in an environment under sunlight. The light for data erasure irradiated from the second optical irradiation system 23 is not limited to short wavelength ultraviolet rays, but, for example, ultraviolet rays having a wavelength of 280 nm or longer included in sunlight may be used as long as the photocatalyst layer 13 is allowed to demonstrate oxidation.

Furthermore, the second optical irradiation system 23 is set so that the entire surface of the CD 10 is irradiated with light. By setting the second optical irradiation system 23 so that the entire surface of the CD 10 is irradiated with light, the data recorded in the organic pigment recording layer 12 of the CD 10 can be erased collectively and thoroughly. The present disclosure is not limited to the case where the second optical irradiation system 23 is set so that the entire surface of the CD 10 is irradiated with light, but all that is needed is that the entire photocatalyst layer 13 that contacts the organic pigment recording layer 12 of the CD 10 is irradiated with light and, for example, a portion corresponding to the radius of the CD 10 may be selected as an irradiation range and the entire surface of the CD 10 may be irradiated with light by rotating the CD 10 using the spindle motor 22.

The control device 24 is designed to control the first optical irradiation system 21, spindle motor 22 and second optical irradiation system 23, and includes the reading control device 241 and erasure control device 242. The control device 24 may be constructed of hardware such as a CPU for performing various calculations and control, a RAM that temporarily stores data for carrying out calculations and functions as a work area during data reading or data erasure, a ROM that stores a control program and a peripheral circuit.

The reading control device 241 is the means for performing control over reading data recorded in the CD 10 and is functionally realized by the CPU executing the control program stored in the ROM or RAM and controlling the hardware. The reading control device 241, for example, receives a data reading command of the user from the operation section 25, controls the first optical irradiation system 21 and spindle motor 22, irradiates the CD 10 with a laser beam for data reading and reads data recorded in the organic pigment recording layer 12. The laser beam for data reading irradiated from the first optical irradiation system 21 is light having a wavelength reflected by the light reflecting layer 14, and, for example, a wavelength of 700 nm may be used. The function and configuration of the reading control device 241 can be the same as those for a conventional CD reading apparatus, and therefore detailed descriptions thereof will be omitted.

The erasure control device 242 is the means for performing control over erasing data recorded in the CD 10 and is functionally realized by the CPU executing the control program stored in the ROM or RAM and controlling the hardware. The erasure control device 242 receives a data erasure command of the user from the operation section 25, controls the second optical irradiation system 23, irradiates the CD 10 with light for data erasure whereby the photocatalyst layer 13 demonstrates oxidation for a certain period of time and erases the data recorded in the organic pigment recording layer 12. The erasure control device 242 causes, after, for example, irradiation of light by the second optical irradiation system 23 for a certain period of time, the reading control device 241 to judge whether or not data can be read and can cause the second optical irradiation system 23 to irradiate light for the certain period of time again when the reading control device 241 judges that data can be read. Furthermore, the duration of light irradiation can be set to an optimum time according to the material and thickness of the organic pigment recording layer 12 and photocatalyst layer 13 of the CD 10.

The operation section 25 is operation device such as an operation panel or remote control or the like provided outside the reading/erasure apparatus 20 and has the function of receiving an operation by the user and sending the received information to the control device 24. For example, the operation section 25 has a data erasure button and when the data erasure button is pressed by the user, data erasure processing by the reading/erasure apparatus 20 is executed.

The operation method of the optical recording medium reading/erasure system 100 configured as shown above will be described below.

First, the control device 24 executes processing of receiving the CD 10. That is, the control device 24 introduces the CD 10 into the reading/erasure apparatus 20 through the operation by the user, performs processing at the time of introduction (e.g., reading, display or the like of CD information) and waits for an instruction from the user.

Upon receiving the user's data reading command from the operation section 25, the control device 24 performs processing of reading data recorded in the CD 10. That is, the control device 24 receives the user's reading command from the operation section 25 and thereby performs control over the first optical irradiation system 21 and spindle motor 22. The control device 24 can not only perform such control upon receiving the user's reading command but also automatically read the data recorded in CD 10 at the stage of receiving the CD 10.

Upon receiving the user's data erasure command from the operation section 25, the control device 24 performs processing of erasing the data recorded in CD 10. That is, the control device 24 receives the user's erasing command from the operation section 25, and can thereby cause the second optical irradiation system 23 to irradiate light for a certain period of time until the photocatalyst layer 13 demonstrates oxidation. As described above, short wavelength ultraviolet rays can be used as the light irradiated from the second optical irradiation system 23.

According to the optical recording medium reading/erasure system 100 of the present embodiment, the CD 10 has the photocatalyst layer 13 in contact with the organic pigment recording layer 12 and by irradiating the CD 10 with light whereby the photocatalyst layer 13 demonstrates oxidation, it is possible to alter the quality of organic pigment making up the organic pigment recording layer 12 and erase the data recorded in CD 10 collectively. As a result, the burden in erasing the CD data can be reduced.

The aforementioned reading/erasure apparatus has been described as an example of the erasure apparatus described in the scope of claims. As another example of the erasure apparatus, it is also possible to use, for example, a configuration resulting from removing the configuration of irradiating reading light (first optical irradiation system 21, reading control device 241 or the like) from the configuration shown in FIG. 3.

Modification Example 1

The preferred embodiment of the present disclosure has been described so far, but the present disclosure is not limited to the above embodiment, and it is possible for those skilled in the art to make various modifications, additions or omissions without departing from the thought and range expressed in the scope of claims.

For example, a case has been described in the above described embodiment where data in the CD 10 is erased by providing the reading apparatus 20 with the second optical irradiation system 23 that irradiates light for erasure, but the present disclosure is not limited to this and it is also possible to erase data in the CD 10 using the first optical irradiation system 21 without using the second optical irradiation system 23 that irradiates light for erasure for the reading apparatus 20. In this case, repeatedly using a normal reading function causes the organic pigment catalyst layer 13 of the CD 10 to be oxidized gradually, making it possible to erase the recorded data.

Modification Example 2

Furthermore, a case has been described in the present embodiment where operation processing of erasing data in the CD 10 is performed by the reading apparatus 20 upon receiving the user's erasing command from the operation section 25, but the present disclosure is not limited to this case, and it is also possible to automatically perform processing of data erasure, for example, after reading the CD 10 a specified number of times. Hereinafter, this processing will be described using FIG. 4. Steps (including some steps with no reference numerals assigned) can be arbitrarily changed in order or executed in parallel within a range not causing discrepancy in processing contents. Furthermore, in the modification example of the present embodiment, suppose the CD 10 records the maximum number of times (specified number of times) the reading apparatus 20 can read data beforehand and data can be read/written from/to the CD 10 the number of times (number of playback times) data is read. The specified number of times can be determined beforehand by, for example, the rental service provider that lends the CD 10.

First, the control device 24 receives the CD 10 (step S100), receives the user's data reading command from the operation section 25, irradiates the CD 10 with a laser beam for reading and reads (plays back) the data recorded (step S101). Next, the control device 24 reads the number of times of playback and the specified number of times recorded in the CD 10 (step S102). Next, the control device 24 adds "1" to the number of times of playback (step S103). Next, the control device 24 compares the number of times of playback with the specified number of times (step S104). When the comparison result shows that the number of times of playback is not equal to or above the specified number of times (step S104: No), the number of times of playback is overwritten into the CD 10 (step S105). Overwriting into the CD 10 may be performed by irradiating the first optical irradiation system 21 with a laser beam for writing.

On the other hand, when the comparison result shows that the read number of times of playback is equal to or above the specified number of times (step S104: Yes), the control device 24 irradiates the CD 10 with light for data erasure whereby the photocatalyst layer 13 demonstrates oxidation and erases the recorded data (step S106). This completes the present operation processing.

According to the modification example of the above described present embodiment, a content is automatically erased after reading the specified number of times (playback), and thus the collection of the CD 10 is no longer necessary and as a result, it is possible to reduce the burden on the user and rental service provider accompanying the collection of the CD in the rental service of the CD in which the content is recorded.

A case has been described in the modification example of the present embodiment where the number of times of playback and the specified number of times are stored in the CD 10 itself, but the present invention is not limited to this case, and it is also possible to record a specific ID in the CD 10, cause the reading apparatus 20 to access a server and report the specific ID to the server via a network, record and manage the number of times of playback and the specified number of times in association with the specific ID on the server. In this case, the reading apparatus 20 may also receive information as to whether or not the number of times of playback has reached the specified number of times from the server according to the CD 10 to be read and make the above described judgment.

Modification Example 3

Furthermore, a case has been described in the present embodiment where the photocatalyst layer 13 included in the CD 10 is provided between the organic pigment recording layer 12 and the light reflecting layer 14, but the present disclosure is not limited to this, and the photocatalyst layer 13 needs only to be disposed in contact with the organic recording layer 12, and, for example, the photocatalyst layer 13 may also be provided between the substrate 11 and the organic pigment recording layer 12 or both between the substrate 11 and the organic pigment recording layer 12, and between the organic pigment recording layer 12 and the light reflecting layer 14.

Modification Example 4

A case has been described in the above described present embodiment and modification examples where a CD is taken as an example of the optical recording medium, but the present disclosure is not limited to this, and is applicable to any optical recording medium including an organic pigment recording layer, and applicable, for example, to a digital versatile disk (DVD) or blue-ray disk (BD).

What is claimed is:
1. An optical recording medium comprising:
   a substrate;
   an organic pigment recording layer formed on the substrate; and
   a photocatalyst layer in physical contact with the organic pigment recording layer;
   wherein the photocatalyst layer is configured to demonstrate oxidation in response to being irradiated with light having a first wavelength such that the oxidation of the photocatalyst layer causes erasure of data recorded in the organic pigment recording layer.
2. The optical recording medium according to claim 1, wherein the photocatalyst layer is configured to demonstrate oxidation when irradiated with ultraviolet rays of a short wavelength.
3. The optical recording medium according to claim 1, wherein the organic pigment recording layer is configured to record data in response to being irradiated by light having a second wavelength, and wherein the second wavelength is different from the first wavelength.
4. The optical recording medium according to claim 1, wherein the organic pigment recording layer is configured to allow read out of data in response to receiving the light having the first wavelength.
5. An erasure apparatus that erases information recorded in an optical recording medium the erasure apparatus comprising:
   a first optical irradiation system configured to emit light having a first wavelength at the optical recording medium, wherein the optical recording medium includes an organic pigment recording layer and a photocatalyst layer in physical contact with the organic pigment recording layer, and wherein the light having the first wavelength is configured to cause oxidation of the photocatalyst layer and erasure of data recorded in the organic pigment recording layer; and
   a control system configured to cause the first optical irradiation system to irradiate the optical recording medium with the light having the first wavelength.
6. The erasure apparatus according to claim 5, wherein the control system is configured to receive an irradiation instruction from a user to erase the optical recording medium and cause the first optical irradiation system to emit the light having the first wavelength in response to receiving the irradiation instruction, and wherein the first optical irradiation system is configured to irradiate the optical recording medium with the light having the first wavelength to erase the information recorded in the organic pigment recording layer.

7. The erasure apparatus according to claim 5, wherein the control system is configured to cause irradiation of the optical recording medium with the light having the first wavelength in response to the optical recording medium being read a predetermined number of times.

8. The erasure apparatus according to claim 5, further comprising a reading control device configured to:
   determine whether data can be read from the organic pigment recording layer after irradiation of the photocatalyst layer with the light having the first wavelength; and
   cause another instance of irradiation of the photocatalyst layer with the light having the first wavelength in response to a determination that data can be read from the organic pigment recording layer after a previous irradiation of the photocatalyst layer with the light having the first wavelength.

9. The erasure apparatus according to claim 5, wherein the duration of the irradiation of the photocatalyst layer is adjustable.

10. The erasure apparatus according to claim 5, further comprising a second optical irradiation system configured to emit light having a second wavelength to write data to the organic pigment recording layer.

11. The erasure apparatus according to claim 5, further comprising a second optical irradiation system configured to emit light having a second wavelength to read data from the organic pigment recording layer.

12. The erasure apparatus according to claim 5, further comprising a second optical irradiation system configured to emit light having the first wavelength to read data from the organic pigment recording layer such that each instance of reading data from the organic pigment recording layer causes a gradual erasure of the organic pigment recording layer.

13. An erasure method for erasing information recorded in an optical recording medium the erasure method comprising:
   providing the optical recording medium, wherein the optical recording medium includes an organic pigment recording layer configured to store data and a photocatalyst layer in physical contact with the organic pigment recording layer; and
   irradiating the optical recording medium with light having a first wavelength such that the photocatalyst layer demonstrates oxidation, and wherein the oxidation of the photocatalyst layer causes erasure of data stored on the organic pigment recording layer.

14. The erasure method according to claim 13, further comprising irradiating the optical recording medium with light having a second wavelength to write data to the organic pigment recording layer, wherein the second wavelength is different from the first wavelength.

15. The erasure method according to claim 13, further comprising irradiating the optical recording medium with light having a second wavelength to read data from the organic pigment recording layer.

16. The erasure method according to claim 13, further comprising irradiating the optical recording medium with the light having the first wavelength to read data from the organic pigment recording layer such that each instance of reading data from the organic pigment recording layer causes a gradual erasure of the organic pigment recording layer.

17. The erasure method according to claim 13, further comprising modifying a duration of the irradiation of the optical recording medium with the light having the first wavelength.

18. The erasure method according to claim 13, further comprising:
   determining whether data can be read from the organic pigment recording layer after irradiating the photocatalyst layer with the light having the first wavelength; and
   causing another instance of irradiation of the photocatalyst layer with the light having the first wavelength in response to a determination that data can be read from the organic pigment recording layer after a previous irradiation of the photocatalyst layer with the light having the first wavelength.

* * * * *

UNITED STATES PATENT AND TRADEMARK OFFICE
CERTIFICATE OF CORRECTION

| | |
|---|---|
| PATENT NO. | : 8,077,589 B2 |
| APPLICATION NO. | : 12/642392 |
| DATED | : December 13, 2011 |
| INVENTOR(S) | : Kusuura |

It is certified that error appears in the above-identified patent and that said Letters Patent is hereby corrected as shown below:

In Column 8, Line 47, in Claim 5, delete "medium" and insert -- medium, --, therefor.

In Column 9, Line 38, in Claim 13, delete "medium" and insert -- medium, --, therefor.

Signed and Sealed this
First Day of May, 2012

David J. Kappos
*Director of the United States Patent and Trademark Office*